United States Patent [19]

Shen et al.

[11] Patent Number: 5,427,872
[45] Date of Patent: Jun. 27, 1995

[54] DENDRITE PREVENTING SEPARATOR FOR SECONDARY LITHIUM BATTERIES

[75] Inventors: David H. Shen, Arcadia; Subbarao Surampudi, Glendora; Chen-Kuo Huang, South Pasadena; Gerald Halpert, Pasadena, all of Calif.

[73] Assignee: The United States of America as represented by the Administrator of the National Aeronautics and Space Administration, Washington, D.C.

[21] Appl. No.: 154,322

[22] Filed: Nov. 17, 1993

[51] Int. Cl.⁶ .............................................. H01M 2/14
[52] U.S. Cl. ........................................ 429/142; 429/144; 429/218; 429/248; 429/249
[58] Field of Search ............... 429/142, 144, 248, 249, 429/218

[56] References Cited

U.S. PATENT DOCUMENTS

| | | | |
|---|---|---|---|
| 4,405,694 | 9/1983 | Goebel et al. | 429/101 |
| 4,410,608 | 10/1983 | Goebel et al. | 429/101 |
| 4,444,854 | 4/1984 | Hooke | 429/144 |
| 4,514,474 | 4/1985 | Momyer et al. | 429/27 |
| 4,626,481 | 12/1986 | Wilson | 429/18 |
| 4,863,815 | 9/1989 | Chang et al. | 429/94 |
| 4,873,158 | 10/1989 | Chang et al. | 424/61 |
| 4,897,323 | 1/1990 | Hennrich et al. | 429/94 |
| 5,017,442 | 5/1991 | Watanabe et al. | 429/94 |
| 5,290,644 | 3/1994 | Andrieu | 429/129 |

OTHER PUBLICATIONS

Proc. Power Sources Symposium, (1984) (month n/a) pp. 98–103. An article by Abraham, et al. titled "Electrical Performance of 5 Ampere-Hour Li/TiS₂ Secondary Cells."

Journal of Power Sources, 18 (1986) (month n/a) pp. 127–131. An Article by Shen, et al. titled "Examination of Design Options for 35A h Ambient Temperature Li—TiS₂ Cells."

*Primary Examiner*—Stephen Kalafut
*Assistant Examiner*—M. Nuzzsolillo
*Attorney, Agent, or Firm*—John H. Kusmiss; Thomas H. Jones; Guy M. Miller

[57] ABSTRACT

Dendrites are prevented from shorting a secondary lithium battery by use of a first porous separator such as porous polypropylene adjacent the lithium anode that is unreactive with lithium and a second porous fluoropolymer separator between the cathode and the first separator such as polytetrafluoroethylene that is reactive with lithium. As the tip of a lithium dendrite contacts the second separator, an exothermic reaction occurs locally between the lithium dendrite and the fluoropolymer separator. This results in the prevention of the dendrite propagation to the cathode.

4 Claims, 1 Drawing Sheet

DENDRITE PREVENTING SEPARATOR FOR SECONDARY LITHIUM BATTERIES

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to ambient temperature, secondary lithium batteries and more particularly, this invention relates to a separator which prevents shorts caused by dendrites in such batteries.

BACKGROUND OF THE INVENTION

Advanced, high energy density batteries are required for use in space, military, communication and automotive applications. The power requirements for these application vary from a few tens of watts to a few kilowatts. Most of these applications are mass, volume and cost sensitive. Certain jurisdictions such as California have mandated that an increasing percentage of automobiles must be powered by electricity within the next few years. The lead-acid battery, though reliable and capable of many recharge cycles, is too heavy and has too low an energy to weight ratio. State of the art Ag-Zn and Ni-Cd batteries have poor charge retention properties and are also too heavy and bulky for use on space missions and in some cases do not meet the life and environmental requirements. They also have poor charge retention properties.

Ambient temperature, secondary lithium batteries have several intrinsic and potential advantages including higher energy density, longer active shelf life, and lower self discharge over conventional Ni-Cd, Pb-acid and Ag-Zn batteries. Successful development of these batteries will yield large pay-offs such as 2—3 fold increase in energy storage capability and a longer active shelf life of 2 to 4 years over Ni-Cd. These cells are most suitable for small spacecraft application requiring less than 1 kW power. Secondary lithium batteries are presently being considered for a number of advanced planetary applications such as: planetary rovers (Mars Rover, Lunar Rover), planetary space craft/probes (MESUR, AIM, ACME Mercury Orbiter) and penetrators. These batteries may also be attractive for astronaut equipment, and Geo-SYN spacecraft.

Secondary lithium cells under development employ lithium metal as the anode, transition metal chalcogenides such as oxides and sulfides, for example, $TiS_2$, $MoS_2$, $MoS_3$, $NbSe_3$, $V_2O_5$, $Li_xMn_2O_4$, $Li_xCoO_2$, $LiV_3O_8$ and $Li_xNiO_2$ as the cathode and liquid organic or solid polymeric electrolytes. During discharge of the cell, lithium metal is oxidized into lithium ions at the anode and lithium ions undergo an intercalation reaction at the cathode. During charge reverse processes occur at each electrode.

Rechargeable batteries using lithium anodes and transition metal oxide or chalcogenide cathodes were extensively investigated as candidates for powering electric vehicles about ten years ago. These batteries have not proved to be acceptable for this use due to poor cycle-life performance and concerns about their safety. Lithium is a very reactive material. When freshly deposited, lithium is highly active and can react with most inorganic and organic electrolytes which results in lower cycling efficiency. Prolonged cycling of secondary lithium cells produces large quantities of finely divided, dendritic lithium increasing the risk of thermal runaway. Hence, ambient temperature secondary lithium cells are potentially unsafe after 1 extended cycling, or after 2 being subjected to overcharge followed by over discharge.

The limited cycle life of state of the art, ambient temperature secondary lithium cells is believed due to formation of shorts during cycling. The best state of the art cells are found to provide 200-300 cycles at 100% DOD. However, 20-30% of these cells failed even before 100 cycles due to the formation of shorts. Some cells even vented after the formation of shorts.

Dendritic lithium growth and degradation of electrolyte by reaction with pure lithium can be reduced by use of mixed solvent electrolytes or lithium anodes that undergo displacement or insertion reactions at activities less than unity. Several lithium alloys and intercalation compounds are under investigation as candidates for Li anode materials. The best performing of these alternative anode materials are $LiC_6$ or $LiAl$. These alternative electrodes do improve reversibility and cycle life of the cells. However, their use results in a reduction of cell specific energy and power density. The energy and power reduction might be an acceptable trade-off if there was a significant improvement in cell cycle life, performance and safety. These two alternate anode materials have other limitations. $LiC_6$ demonstrates poor ability to retain charge and LiAl has poor mechanical strength during cycling. Other anode materials that undergo insertion reactions such as graphite, LiAlX ternary alloys and other intercalation compounds are being investigated for use in an ambient temperature, secondary lithium cell. These approaches do delay the formation of shorts and extend the cycle life of the cells.

Presently microporous polypropylene and nonwoven glass paper are the materials of choice for use as separators in secondary lithium cells. These materials do not prevent lithium dendrites from shorting the cell. The longest lithium dendrite extending from the anode will penetrate the separator and will eventually contact the cathode and short the cell. For safety reasons a thermal fuse has been provided in these cells. The surface of the separator is coated with a wax coating that melts when the temperature of the separator rises as the cell is shorted. The wax coating melts and blocks all the pores in the separator.

Referring now to FIG. 1, a prior art cell 10, comprises an electrolyte impervious housing 12 containing a lithium anode 14, a set of porous separators 16, 17 such as Celgard, a porous polypropylene, containing liquid electrolyte and a composite chalcogenide cathode 18 usually supported on a current collector 20 such as nickel or stainless steel mesh. The cell contains a thermal fuse layer 22 such as a low melting polyethylene wax which is inert in the electrochemical environment of the cell between the two inert separators 16, 17.

During cycling of the cell 10, a lithium dendrite 30 will form and extend normal from the surface 32 of the anode 14. Referring now to FIG. 2, as it grows the dendrite 31 will at first be blocked by the first separator 16. As cycling of the cell 10 continues the dendrite 33 will penetrate the first separator 16, thermal fuse layer 22 and be temporarily stopped by the second separator 17. However, eventually one of the dendrites 35 will penetrate the second separator 17 and will grow and contact the surface 24 of the cathode 18 and will cause the cell to short. The temperature within the cell will be raised to the melting temperature of the thermal fuse layer 22. The thermal fuse layer 22 will melt and will block all the pores in both separators 16, 17. The cell reaches open circuit condition and becomes non-functional.

STATEMENT OF THE INVENTION

The present invention significantly increases the cycle life of ambient temperature, rechargeable lithium cells by preventing dendrites from shorting the cell. This is accomplished by disposing a sheet of synthetic organic resin material that exothermically reacts with lithium dendrites and prevent further growth and extension of the dendrite toward the cathode. The separator must be porous to electrolytes.

The sheet of dendrite reactive material can be an inert thermoplastic separator such as polypropylene or polyethylene containing a coating of fluoropolymer. A preferred reactive material is in the form of a free standing second reactive separator such as a fluorinated polymer, suitably a polytetrafluoroethylene. However, since the anode can also react with the second separator a layer of porous, inert separator such as polypropylene is disposed between the anode and the reactive separator.

Since the reactive separator is only blocked locally when the tip of the dendrite reacts with it, the remainder of the separator remains porous to electrolytes and the cell will continue to function and allow transport of ions between the electrodes. The cell will continue to function until a major portion of the reactive separator is blocked due to reaction with dendrites. The use of the reactive separator of the invention will significantly extend the cycle life of the lithium secondary batteries and since the formation of shorts is reduced, the safety of cells containing the separator of the invention is significantly enhanced.

These and many other features and attendant advantages of the invention will become apparent as the invention becomes better understood by reference to the following detailed description when considered in conjunction with the accompanying drawings.

List Of Prior Art

| Patentee/Author | Patent No./Citation |
| --- | --- |
| 4,405,694 | Goebel, et al. |
| 4,410,608 | Goebel, et al. (2) |
| 4,514,474 | Momyer, et al. |
| 4,626,481 | Wilson |
| 4,863,815 | Chang, et al. |
| 4,873,158 | Chang, et al. (2) |
| 4,897,323 | Hennrich, et al. |
| 5,017,442 | Watanabe, et al. |

Abraham, et al. "Electrical Performance of 5 ampere-hour Li/TiS$_2$ Secondary Cells." "Proc. Power Sources Symposium" (1984) pp 98–103
Shen, et al. "Examination of Design Options for 35 A h Ambient Temperature Li-TiS$_2$ Cells." "Journal of Power Sources" 18 (1986) pp 127–131.

DISCUSSION OF THE PRIOR ART

The Goebel, et al. patents disclose a primary spiral lithium cell which uses PTFE as a binder for the carbon cathode and as an antiparasitic coating for the exposed portions of the anode. Momyer, et al. utilizes a polypropylene separator and a PTFE film on the current collector grid in an air cathode battery. Wilson utilizes PTFE insulators in a bipolar battery. Hennrich, et al. discloses use of a PTFE separator in Li Cd/MnO or AgO primary cell. The two literature references disclose state of the art ambient temperature, Li/TiS$_2$ secondary batteries utilizing porous polypropylene separators.

Watanbe, et al. discloses use of an outer insulation film 14 of polyolefin such as polypropylene, polyester or PTFE in a coiled primary lithium cell utilizing a polypropylene separator. The insulation film is designed to prevent dendrites from shorting the cell to the outer casing. There is no disclosure of a reactive film since polyolefins and polyesters are non-reactive with the dendrites.

The 815 Chang, et al. patent discloses coating a lithium battery casing with polypropylene or PTFE to protect it from lithium deposition. The 158 patent at column 3 discloses use of a PTFE separator in a lithium anode/CaCl-carbon cathode secondary cell.

The use of a composite polypropylene - PTFE separator in an ambient temperature secondary cell is not disclosed nor rendered obvious by the cited art.

DETAILED DESCRIPTION OF THE INVENTION

Figure 1:
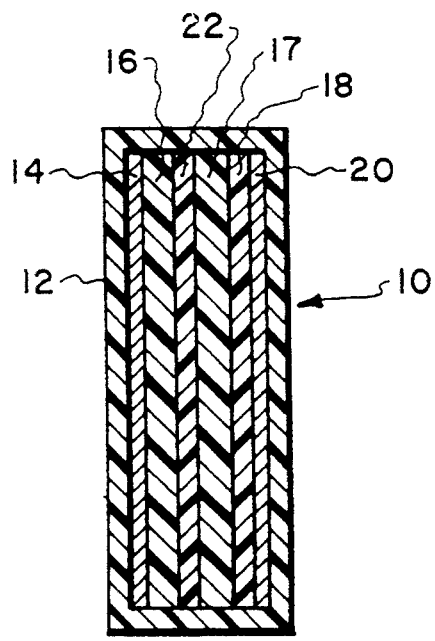
FIG. 1 is a view in section of a prior art secondary lithium cell.
Figure 2:
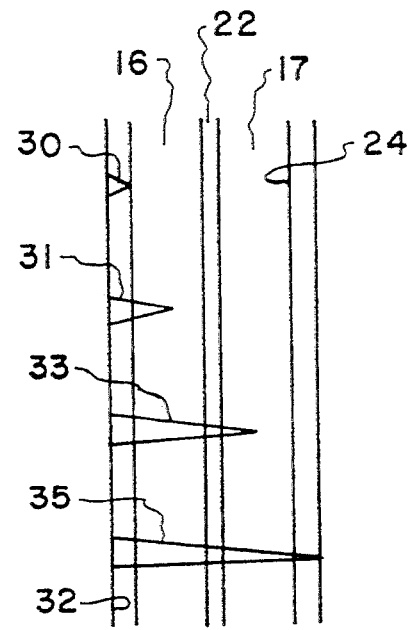
FIG. 2 is a schematic illustration of dendrite growth in a prior art lithium cell.
Figure 3:
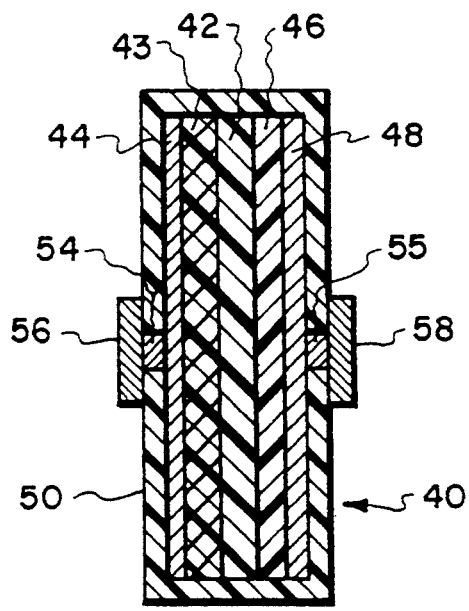
FIG. 3 is a view in section of a secondary lithium cell according to the invention.

As shown in FIG. 3, the composite reactive separator 42 is used to prevent dendrites from reaching the cathode 46 and shorting the thin secondary battery 40. The battery 40 includes an anode 44 comprising a thin film of lithium or other source of lithium ions. The cathode may be attached to a current collector 48 such as nickel or stainless steel mesh. An inert separator 43 such as porous polypropylene is disposed adjacent the anode 44 and the reactive separator 42 is disposed adjacent the cathode 46. The battery may be enclosed in a hermetically sealed polymeric or metallic enclosure 50. Leads 54, 55 connect the anode 44 and cathode 46 to terminals 56, 58. The battery may suitably be provided in disc form with terminals 56, 58 on the top and bottom faces, respectively.

The preferred cell is a spiral-wound battery containing a lithium anode and a chalcogenide cathode disposed within a sealed casing. The electrodes are separated by a first sheet of porous separator inert to lithium and a second sheet of porous separator material reactive with lithium, both imbibed with liquid electrolyte. The cathode consists of a composite layer of polymeric binder containing a dispersion of chalcogenide or oxide particles such as TiS$_2$, Li$_x$CoO$_2$, LiNbSe$_3$, LiMOS$_2$, LiVO$_x$ and LiM$_2$O$_2$ pressed into a current collector such as a sheet of expanded nickel. The polymeric binder is preferably an elastomer such as EPDM. The anode can be lithium, a lithium alloy such as Li$_x$Co$_3$, LiAl or an intercalated lithium compound such as Mg$_2$Si dispersed in an organic polymeric binder, preferably an elastomer not reactive with lithium such as EPDM as disclosed in copending application Ser. No. 07/959,858, filed Oct. 13, 1992, entitled Anode For Rechargeable Ambient Temperature Lithium Cells, the disclosure of which is expressly incorporated herein by reference.

The binder is present in an amount 0.5 to 5% by weight of an organic polymer. The binder can be a hydrocarbon polymer such as polyethylene or polypropylene. However, longer cycle life is provided by use of elastomers which are capable of yielding as the intercalated compounds expand and contract.

The elastomers should be inert to the solvent and stable in the electrochemical environment of the cell. The elastomer preferably has a glass transition temperature, Tg, below −20° C. Preferred elastomers do not contain halogen or unsaturation, both of which are reactive with lithium ions. Preferred materials are ethylene-propylene (EPR) elastomers or ethylene-propylene-diene (EPDM) elastomers having a Mooney Viscosity (212° F.) between 10 and 100, usually from 35 to 75. EPDM polymers containing 50 to 70 mol percent ethylene, 20 to 40 mol percent propylene and 5 to 20 mol percent norborene are available from several commercial sources. The norborene group can be utilized for crosslinking by radiation or by heat.

The inert, porous separator is an organic polymer that is non-reactive with lithium or lithium ions. Preferred materials are aliphatic hydrocarbon polymers, preferably saturated polyolefins such as polyethylene or polypropylene. Celgard, a porous polypropylene which is used in secondary, ambient temperature lithium cells can be utilized.

The electrolyte comprises a solution of an ionized lithium salt in a highly polar solvent such as sulfolane or 2-methyl tetrahydrofuran (2MeTHF). The solvent may also contain from 5 to 20 percent of an agent such as ethylene carbonate which is capable of modifying the surface of the lithium electrode to form a solid electrolyte film as described in U.S. Pat. No. 5,030,528, the disclosure of which is incorporated herein by reference. The salt, usually contains an anion or complexing moiety, Z, such as halide, sulfate, arsenofluoride, beta-alumina, thiocyanate, nitrate, phosphofluoride, percholorate, fluoroborate, aryl borate, etc. The concentration of salt in the electrolyte can be from 0.5 to 3.0 molar, usually from about 0.8 to 1.5 molar. Especially useful electrolyte salts include $LiAsF_6$, $LiCO_4$, $LiBF_4$, KCNS, LiCNS, lithium tetraphenyl borate, $LiCF_3SO_3$, $LiPF_6$ and the like. $LiAsF_6$ is preferred since it has good stability.

The second separator is formed of a polymer which is coated with fluoropolymers which exothermically react with lithium and locally seal the separator at the location of contact of the separator with the tip of the dendrite. The fluoropolymer can be dispersed in the second separator, coated onto a surface of the separator or can be present on the carbon atoms in the polymer chain.

Preferred porous separators are fluorinated polymers such as polymers of tetrafluoroethylene, chloro-trifluoroethylene or dichloro-difluoroethylene. These materials exothermically react with lithium and since they are thermoplastic will locally melt to seal the porous separator material and prevent further growth of a lithium dendrite. The recommended material for the reactive separator is porous polytetrafluoroethylene which is commercially available and is inert to the cathode and electrolyte.

Figure 4:
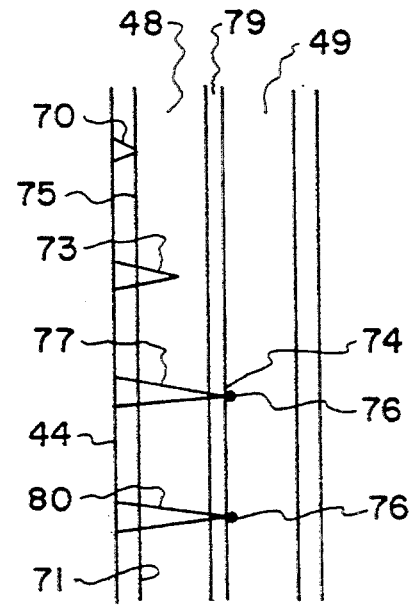
FIG. 4 is a schematic illustration of dendrite growth and termination in a lithium cell containing a reactive separator.

Referring now to FIG. 4, as the cell of FIG. 3 is cycled, a dendrite 70 will format the surface 71 of the anode 44. The dendrite 73 will grow outwardly to the first surface 75 of the inert separator 48, will penetrate the separator 48 and be temporarily stopped or the rate of growth will slow as it enters the separator 48. As the dendrite 77 continues to grow the tip 74 of the dendrite will contact the first surface 79 of the reactive separator 49. The tip 74 of the lithium dendrite will react with the separator 49. The local heat created will locally melt the separator 49 to form a non-porous plug 76 which will seal the pores of the separator and physically block further growth of the dendrite 77. Other dendrites 80 will likewise be stopped by reaction with the second separator to form a plug 76. The cell will continue in operation and can be cycled between discharge and charge cycles until at least 50% of the pores of the second separator are blocked by the plugs formed by reaction with dendrites.

The lithium reactive separator of the invention prevents internal dendrite shortening resulting in improved cycle life and safety of ambient temperature, rechargeable lithium cells. The cells of the invention will find use in spacecraft, military communications, automotive and any other application were high energy density rechargeable batteries are required.

It is to be realized that only preferred embodiments of the invention have been described and that numerous substitutions, modifications and alterations are permissible without departing from the spirit and scope of the invention as defined in the following claims.

We claim:

1. A rechargeable battery comprising in combination an outer housing containing:
  an anode containing a source of lithium metal ions;
  an electrolyte comprising a solution of an ionized lithium salt in a solvent polar organic solvent;
  a first porous separator formed of a synthetic organic aliphatic hydrocarbon resin that is non-reactive with lithium and lithium ions positioned adjacent a surface of the anode, said first separator being imbibed with said electrolyte;
  a cathode comprising a composite layer of organic resin binder containing a dispersion of transition metal oxide or chalcogenide particles disposed on a metal current collector;
  a second porous separator imbibed with said electrolyte disposed between said cathode and said first separator, said second separator consisting essentially of a porous thermoplastic polytetrafluoroethylene reactive with said lithium metal whereby when the tip of a lithium dendrite growing from said surface of the anode penetrates the first separator and contacts said second separator, the dendrite tip and reactive thermoplastic polytetrafluoroethylene forming said second separator react to form a non-porous plug of polytetrafluoroethylene preventing further growth of the dendrite.

2. A battery according to claim 1 in which the first separator comprises porous polypropylene.

3. A composite separator for limiting growth of lithium dendrites in a secondary lithium battery comprising:
  a first layer of a porous hydrocarbon resin unreactive with lithium or lithium ions; and
  a second layer adjacent said first layer of a porous thermoplastic polytetrafluoroethylene that exothermically reacts with the tip of a lithium dendrite to form a non-porous plug of polytetrafluoroethylene.

4. A separator according to claim 3 in which the first layer is formed of a porous polypropylene.

* * * * *